United States Patent
Caragea

(10) Patent No.: US 10,116,630 B2
(45) Date of Patent: Oct. 30, 2018

(54) SYSTEMS AND METHODS FOR DECRYPTING NETWORK TRAFFIC IN A VIRTUALIZED ENVIRONMENT

(71) Applicant: Bitdefender IPR Management Ltd., Nicosia (CY)

(72) Inventor: Radu Caragea, Bucharest (RO)

(73) Assignee: Bitdefender IPR Management Ltd., Nicosia (CY)

( * ) Notice: Subject to any disclaimer, the term of this patent is extended or adjusted under 35 U.S.C. 154(b) by 106 days.

(21) Appl. No.: 15/471,981

(22) Filed: Mar. 28, 2017

(65) Prior Publication Data

US 2017/0289109 A1 Oct. 5, 2017

Related U.S. Application Data

(60) Provisional application No. 62/317,804, filed on Apr. 4, 2016.

(51) Int. Cl.
| | |
|---|---|
| *H04L 29/06* | (2006.01) |
| *G06F 9/455* | (2018.01) |
| *G06F 12/1009* | (2016.01) |
| *H04L 9/14* | (2006.01) |
| *H04L 9/30* | (2006.01) |

(Continued)

(52) U.S. Cl.
CPC ...... *H04L 63/0428* (2013.01); *G06F 9/45504* (2013.01); *G06F 12/1009* (2013.01); *G06F 21/566* (2013.01); *H04L 9/14* (2013.01); *H04L 9/30* (2013.01); *H04L 9/3249* (2013.01);

(Continued)

(58) Field of Classification Search
None
See application file for complete search history.

(56) References Cited

U.S. PATENT DOCUMENTS

| | | | |
|---|---|---|---|
| 8,489,889 B1* | 7/2013 | Moscaritolo | G06F 21/604 379/93.02 |
| 2009/0217043 A1* | 8/2009 | Metke | G06F 21/445 713/171 |

(Continued)

OTHER PUBLICATIONS

European Patent Office, International Search Report and Written Opinion dated May 12, 2017 for PCT International Application No. PCT/EP2017/057422, international filing date Mar. 29, 2017, priority date Apr. 4, 2016.

*Primary Examiner* — Shin-Hon (Eric) Chen
(74) *Attorney, Agent, or Firm* — Law Office of Andrei D Popovici, PC

(57) ABSTRACT

Described systems and methods enable a decryption of encrypted communication between a client system and a remote party, for applications such as detection and analysis of malicious software, intrusion detection, and surveillance, among others. The client system executes a virtual machine and an introspection engine outside the virtual machine. The introspection engine is configured to identify memory pages whose contents have changed between a first session event (e.g., a ServerHello message) and a second session event (e.g., a ClientFinished message). The respective memory pages are likely to contain encryption key material for the respective communication session. A decryption engine may then attempt to decrypt an encrypted payload of the respective communication session using information derived from the content of the identified memory pages.

22 Claims, 8 Drawing Sheets

(51) Int. Cl.
*H04L 9/32* (2006.01)
*G06F 21/56* (2013.01)

(52) U.S. Cl.
CPC ............ *H04L 9/3263* (2013.01); *H04L 63/06* (2013.01); *H04L 63/166* (2013.01); *G06F 2212/154* (2013.01)

(56) References Cited

U.S. PATENT DOCUMENTS

| | | | |
|---|---|---|---|
| 2014/0115702 A1* | 4/2014 | Li | G06F 11/30 726/23 |
| 2014/0137180 A1 | 5/2014 | Lukacs et al. | |
| 2014/0281030 A1 | 9/2014 | Cui et al. | |
| 2015/0013008 A1* | 1/2015 | Lukacs | G06F 21/53 726/24 |
| 2015/0113264 A1 | 4/2015 | Wang et al. | |
| 2015/0271139 A1* | 9/2015 | Lukacs | H04L 63/0209 726/11 |
| 2015/0288659 A1* | 10/2015 | Lukacs | H04L 63/0227 713/2 |

* cited by examiner

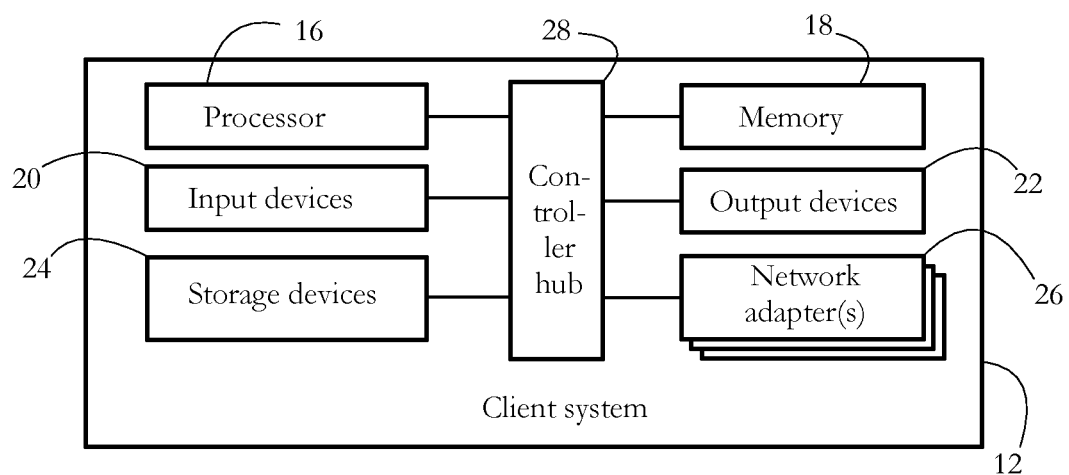
FIG. 2-A
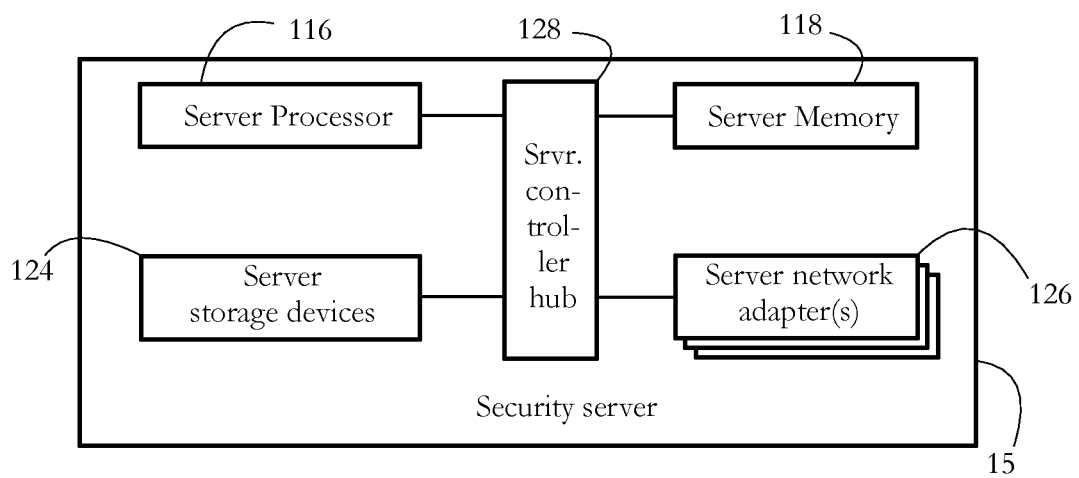
FIG. 2-B

SYSTEMS AND METHODS FOR DECRYPTING NETWORK TRAFFIC IN A VIRTUALIZED ENVIRONMENT

RELATED APPLICATIONS

This application claims the benefit of the filing date of U.S. provisional patent application No. 62/317,804, filed on Apr. 4, 2016, entitled "Systems and Methods for Decrypting Network Traffic in a Virtualized Environment," the entire contents of which are incorporated by reference herein.

BACKGROUND

The invention relates to computer security systems and methods, and in particular to encrypted electronic communication.

In the modern digital world, a wide variety of products and services rely on data encryption. Encrypted communications enable, among others, online commerce, online banking, and telephony over data networks such as the Internet. Encryption is also widely used to protect the privacy and personal data of users. In an age of proliferation of interconnected electronic devices (the Internet of Things), reliance on encryption is a strength but also a vulnerability.

In recent years, encryption is increasingly being used for malicious purposes, for instance to conceal the activities of malicious software, or to hold a user's valuable data to ransom. One typical example of malicious software activities comprises setting up a network of hijacked computing systems—commonly known as a botnet—and using the respective network to launch a distributed denial of service attack against a target webserver. As part of setting up the botnet, a software agent is infiltrated into each botnet member, using various methods (e.g., direct hacking, phishing, etc.). The agent may then use encryption to inconspicuously communicate with a remote server, for instance to receive the target's network address and/or to coordinate the attack with other botnet members. Various methods to prevent or counteract such malicious activities have been described, but such countermeasures may be undermined by malware's efficient use of encryption.

Anti-malware operations are further complicated by the advent of hardware virtualization technology, which enables the creation of simulated computer environments commonly known as virtual machines. Several virtual machines may run simultaneously on the same physical machine, sharing the hardware resources among them, thus reducing investment and operating costs. Each virtual machine may run its own operating system and/or software applications, separately from other virtual machines. Hardware virtualization is deployed for various reasons, for instance to ensure portability of software, or to strengthen security. Other popular applications of hardware virtualization, known under the generic name "cloud computing", include webserver farms and virtual desktop infrastructure (VDI). In a typical VDI configuration, a software application executes on a first computer system, while the user interacts with the respective application using a second computer system (terminal). A virtual machine running the respective application is instantiated on-demand on the first computer system, which may end up executing hundreds of such VMs for multiple remote users. Due to the steady proliferation of malware, each virtual machine potentially requires protection against malware.

Escalating security threats and an increasing demand for virtualization generate a strong interest in developing efficient anti-malware systems and methods designed to address the challenges of hardware virtualization.

SUMMARY

According to one aspect, a client system comprises a hardware processor and a memory, the hardware processor configured to execute a virtual machine and an introspection engine. The virtual machine is configured to carry out a communication session with a remote party, the communication session comprising a handshake message followed by an encrypted payload, wherein the handshake message contains an encryption parameter used by the client system to derive an encryption key, and wherein the encrypted payload is encrypted with the encryption key. The introspection engine executes outside the virtual machine and is configured to identify within the memory a target memory page according to whether a content of the target memory page has changed between an occurrence of a first session event of the communication session and an occurrence of a second session event of the communication session. The introspection engine is further configured to transmit the content of the target memory page to a decryption engine configured to decrypt the encrypted payload according to the content.

According to another aspect, a server computer system comprises a hardware processor configured to execute a decryption engine configured to carry out decryption procedures for a plurality of client systems. A decryption procedure comprises receiving a content of a target memory page of a client system of the plurality of client systems, receiving an encrypted payload of a communication session carried out between a virtual machine executing on the client system and a remote party, and in response, decrypting the encrypted payload according to the content of the target memory page. The communication session comprises a handshake message followed by the encrypted payload, wherein the handshake message contains an encryption parameter used by the client system to derive an encryption key, and wherein the encrypted payload is encrypted with the encryption key. The client system is configured to execute an introspection engine outside of the virtual machine, the introspection engine configured to identify the target memory page within a memory of the client system according to whether the content of the target memory page has changed between an occurrence of a first session event of the communication session and an occurrence of a second session event of the communication session.

According to another aspect, a non-transitory computer-readable medium stores instructions which, when executed by a hardware processor of a client system further comprising a memory, cause the hardware processor to form an introspection engine executing outside a virtual machine executing on the client system. The virtual machine is configured to carry out a communication session with a remote party, the communication session comprising a handshake message followed by an encrypted payload, wherein the handshake message contains an encryption parameter used by the client system to derive an encryption key, and wherein the encrypted payload is encrypted with the encryption key. The introspection engine is configured to identify within the memory a target memory page according to whether a content of the target memory page has changed between an occurrence of a first session event of the communication session and an occurrence of a second session event of the communication session. The introspection engine is further configured to transmit the content of the target memory page to a decryption engine configured to decrypt the encrypted payload according to the content.

According to another aspect, a method of decrypting encrypted communications between a client system and a remote party. The client system is configured to execute a virtual machine. The virtual machine is configured to carry out a communication session with the remote party, the communication session comprising a handshake message followed by an encrypted payload, wherein the handshake message contains an encryption parameter used by the client system to derive an encryption key, and wherein the encrypted payload is encrypted with the encryption key. The method comprises employing at least one hardware processor to identify within a memory of the client system a target memory page according to whether a content of the target memory page has changed between an occurrence of a first session event of the communication session and an occurrence of a second session event of the communication session. The method further comprises employing at least one hardware processor to harvest the encrypted payload, and employing at least one hardware processor to decrypt the encrypted payload according to the content of the target memory page.

BRIEF DESCRIPTION OF THE DRAWINGS

The foregoing aspects and advantages of the present invention will become better understood upon reading the following detailed description and upon reference to the drawings where:

FIG. 2-A illustrates an exemplary hardware configuration of a client system according to some embodiments of the present invention.

FIG. 2-B illustrates an exemplary hardware configuration of a security server according to some embodiments of the present invention.

DETAILED DESCRIPTION OF PREFERRED EMBODIMENTS

Figure 1:
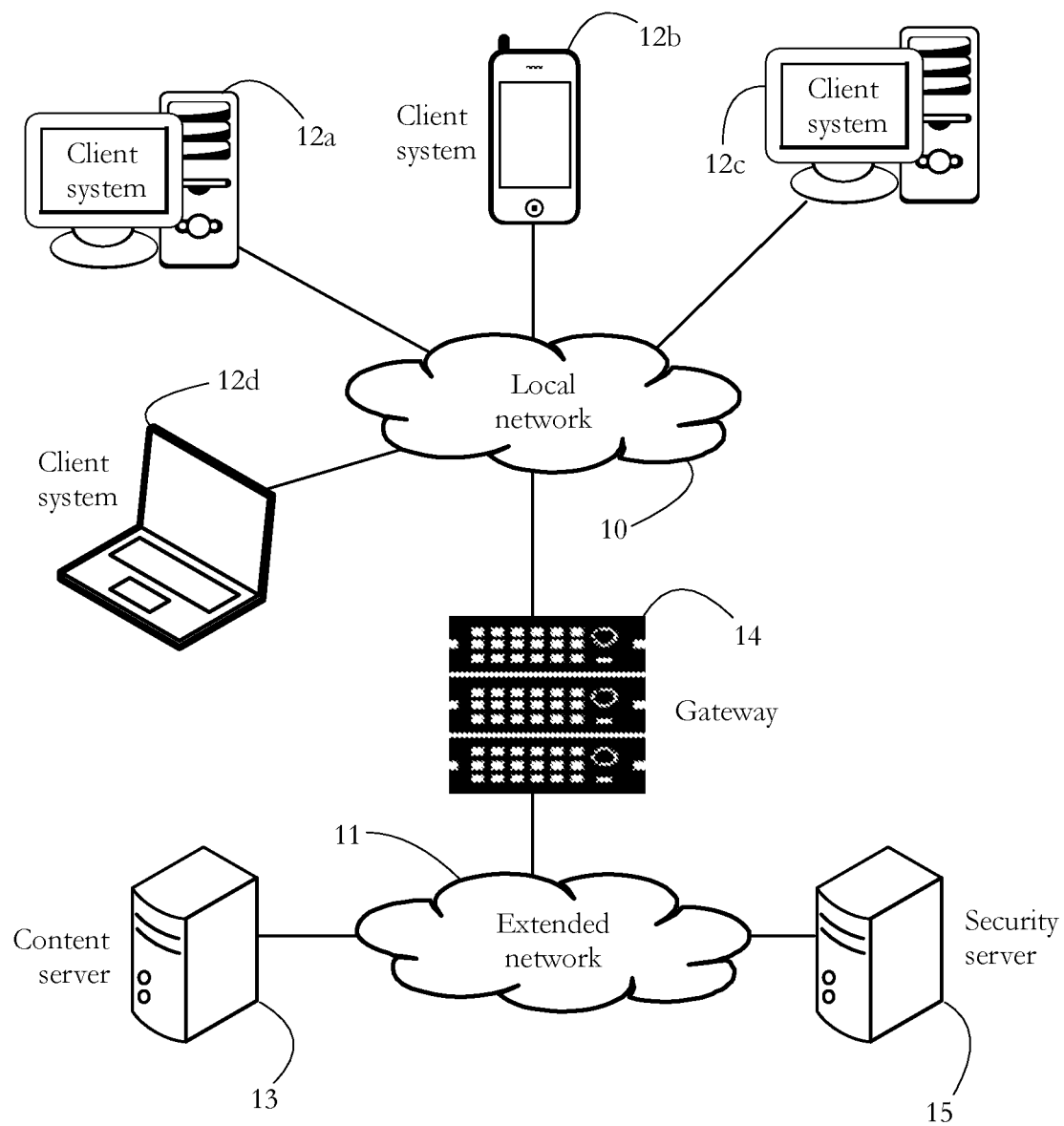
FIG. 1 illustrates an exemplary configuration wherein client systems collaborate with a security server to decrypt potentially malicious network traffic according to some embodiments of the present invention.

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise specified, any use of "OR" refers to a non-exclusive or. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Computer security encompasses protecting users and equipment against unintended or unauthorized access to data and/or hardware, unintended or unauthorized modification of data and/or hardware, and destruction of data and/or hardware. A computer program is a sequence of processor instructions carrying out a task. Computer programs described in some embodiments of the present invention may be stand-alone software entities or sub-entities (e.g., subroutines, libraries) of other computer programs. Unless otherwise specified, guest software executes within a virtual machine. A program is said to execute within a virtual machine when it executes on a virtual processor of the respective virtual machine. A process is an instance of a computer program, such as an application or a part of an operating system, and is characterized by having at least an execution thread and a virtual memory space assigned to it, wherein a content of the respective virtual memory space includes executable code. Unless otherwise specified, a page represents the smallest unit of virtual memory that can be individually mapped to a physical memory of a host system. Unless otherwise specified, a memory snapshot of a client system/virtual machine comprises a copy of a content of a section of memory used by the respective client system/virtual machine. Computer readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more microprocessors) programmed to perform the methods described herein, as well as computer-readable media encoding instructions to perform the methods described herein.

The following description illustrates embodiments of the invention by way of example and not necessarily by way of limitation.

FIG. 1 shows an exemplary configuration according to some embodiments of the present invention, wherein a set of client systems 12a-d collaborates with a security server 15 to intercept and decrypt encrypted network traffic occurring between the respective client systems 12a-d and a remote party illustrated as a content server 13. Each of servers 13 and 15 generically represents a set of interconnected computing systems, which may or may not be in physical proximity to each other.

Exemplary client systems 12a-d include corporate computing systems, but also personal computer systems, mobile computing platforms (laptop computers, tablets, mobile telephones), wearable electronic devices (smartwatches), household appliances (smart TVs, thermostats, home surveillance/security systems), or any other electronic device having a processor and a memory and supporting hardware virtualization. One exemplary client system of particular interest to computer security is a computer configured as a honeypot. Honeypot is a generic term used in the art to describe a set of systems and methods for luring malicious entities for data gathering and the study of malicious software. An exemplary honeypot comprises an apparently unprotected computer system which may allow a hacker or malware agent to enter, install software, and/or communicate with other computers over a network.

The illustrated client systems are interconnected via a local communication network 10, such as a corporate network or a home network. Parts of local network 10 may include a local area network (LAN). A gateway device 14 may enable access of client systems 12a-d to an extended network 11 (e.g., the Internet), so that all or part of the network traffic between client systems 12a-d and a remote party traverses gateway device 14. An exemplary gateway device 14 comprises a physical appliance such as a router and/or a switch.

FIG. 2-A shows an exemplary hardware configuration of a client system 12 according to some embodiments of the present invention. Client system 12 may represent any of systems 12a-d in FIG. 1. For simplicity, the illustrated client system is a personal computer; the hardware configuration of other client systems such as mobile telephones, tablet computers, etc., may differ somewhat from the illustrated configuration of FIG. 2-A. Client system 12 comprises a set of physical devices, including a hardware processor 16 and a memory unit 18. Processor 16 comprises a physical device (e.g. a microprocessor, a multi-core integrated circuit formed on a semiconductor substrate, etc.) configured to execute computational and/or logical operations with a set of signals and/or data. In some embodiments, such operations are delivered to processor 16 in the form of a sequence of processor instructions (e.g. machine code or other type of encoding). Memory unit 18 may comprise volatile computer-readable media (e.g. DRAM, SRAM) storing instructions and/or data accessed or generated by processor 16.

Input devices 20 may include computer keyboards and mice, among others, allowing a user to introduce data and/or instructions into system 12. Output devices 22 may include display devices such as monitors. In some embodiments, input devices 20 and output devices 22 may share a common piece of hardware, as in the case of touch-screen devices. Storage devices 24 include computer-readable media enabling the non-volatile storage, reading, and writing of software instructions and/or data. Exemplary storage devices 24 include magnetic and optical disks and flash memory devices, as well as removable media such as CD and/or DVD disks and drives. Network adapters 26 enable system 12 to connect to network 10 and/or to other machines/computer systems. Controller hub 28 generically represents the plurality of system, peripheral, and chipset buses, and/or all other circuitry enabling the inter-communication of devices 16-26 of system 12. For instance, controller hub 28 may include a memory controller, an input/output (I/O) controller, and an interrupt controller, among others. In another example, hub 28 may comprise the northbridge bus connecting processor 16 to memory 18, and/or the southbridge bus connecting processor 16 to devices 20, 22, 24, and 26, among others.

FIG. 2-B shows an exemplary hardware configuration of security server 15 in some embodiments of the present invention. In the illustrated configuration, server 15 comprises a server processor 16, a server memory 18, a set of server storage devices 124, and a set of network adapters 126. Processor 116 may comprise a microprocessor or other physical device configured to execute mathematical and/or logical operations with a set of data. Memory 18 may comprise volatile computer-readable media storing instructions and/or data for execution and/or processing by processor 116. Server storage devices 124 comprise non-volatile computer-readable media such as hard drives, CD and DVD ROMs, and flash memory, among others. Server network adapters 126 enable security server 15 to connect to and exchange data with other electronic devices via extended network 11.

Figure 3:
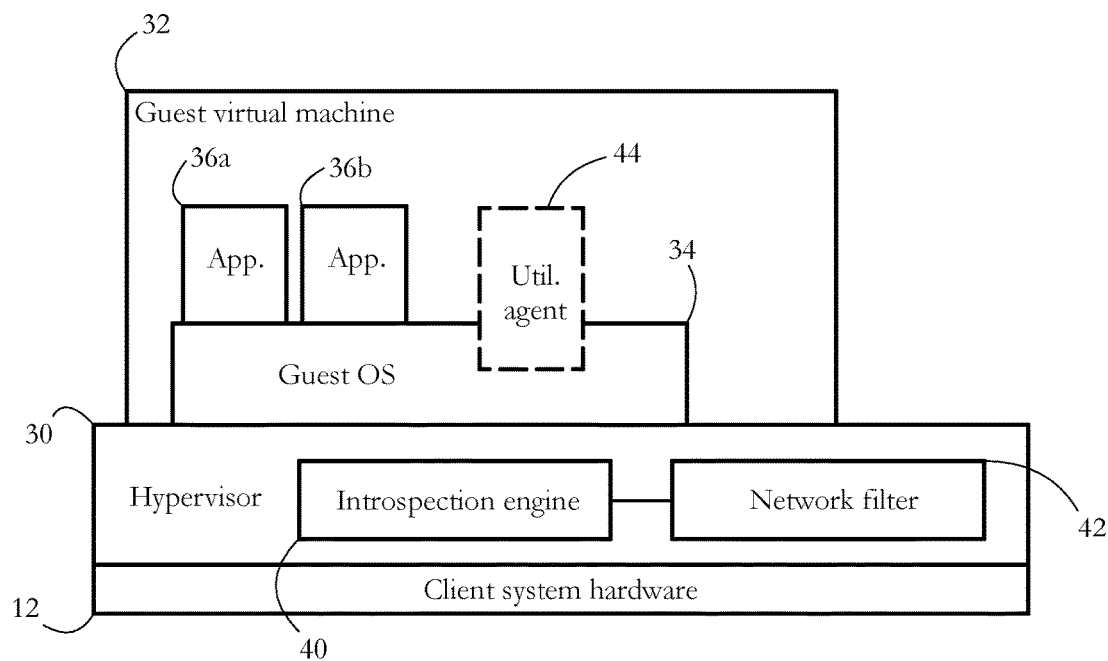
FIG. 3 shows a guest virtual machine (VM) exposed by a hypervisor executing on a client system, and an introspection engine executing outside the guest VM(s) according to some embodiments of the present invention.

FIG. 3 shows a typical software configuration according to some embodiments of the present invention. Client system 12 is configured to expose a set of virtual machines (VM). Although FIG. 3 shows just one guest VM 32, some embodiments may host multiple VMs (e.g., hundreds) operating concurrently. Each virtual machine comprises an emulation of an actual physical machine/computer system, and can execute an operating system and a variety of software applications. Embodiments as illustrated in FIG. 3 may be used to protect customers of cloud computing against malicious software, such as software attempting to steal proprietary, private, and/or confidential data, or software attempting to hijack and transform client system 12 into a botnet member. In such embodiments, client system 12 may represent a server computer system of a cloud service provider. In other exemplary embodiments, client system 12 represents a user's private device, such as a personal computer or a mobile telephone. Such devices often employ hardware virtualization, for instance to increase software portability or to strengthen security. In yet another exemplary embodiment, client system 12 may be configured as a honeypot. In such embodiments, client system 12 may expose multiple virtual machines, for instance one masquerading as a webserver, another masquerading as a personal computer connected to a corporate network, etc.

In some embodiments, a hypervisor 30 executes on client system 12, hypervisor 30 comprising software configured to create or enable a plurality of virtualized devices, such as a virtual processor and a virtual memory management unit, and to present such virtualized devices to software in place of the real, physical devices of client system 12. Such operations are commonly known in the art as exposing a virtual machine. Hypervisor 30 may further enable multiple virtual machines to share the hardware resources of host system 12, so that each VM operates independently and is unaware of other VMs executing concurrently executing on client system 12. Examples of popular hypervisors include the VMware vSphere™ from VMware Inc. and the open-source Xen hypervisor, among others.

In the exemplary configuration illustrated in FIG. 3, guest VM 32 executes a guest operating system (OS) 34, and a set of applications 36a-b. Guest OS 34 may comprise any widely available operating system such as Microsoft Windows®, MacOS®, Linux®, iOS®, or Android™, among others, providing an interface between applications executing within VM 32 and the virtualized hardware devices of guest VM 32. Applications 36a-b generically represent any user application, such as a word processor, spreadsheet application, graphics application, a browser, a social media application, and an electronic communication application, among others. Guest OS 34 and applications 36a-b are herein said to execute within guest VM 32, i.e., they execute on a virtual processor of VM 32. In contrast, hypervisor 30 is said to execute outside guest VM 32.

In some embodiments, exposing guest VM 32 comprises configuring a data structure used by hypervisor 30 to manage operation of guest VM 32. Such a structure will be herein termed virtual machine state object (VMSO). Exemplary VMSOs include the virtual machine control structure (VMCS) on Intel® platforms, and the virtual machine control block (VMCB) on AMD® platforms. In some embodiments, processor 16 associates a region in memory with each VMSO, so that software may reference a specific VMSO using a memory address or pointer (e.g., a VMCS pointer on Intel® platforms).

Each VMSO may comprise data representing a current state of a respective virtualized processor exposed on client system 12. In multithreading configurations, hardware processor 16 may operate a plurality of cores, each core further comprising multiple logical processors, wherein each logical processor may process an execution thread independently of, and concurrently with, other logical processors. Multiple logical processors may share some hardware resources, for instance, a common MMU. In a multithreaded embodiment, a distinct VMSO may be set up for each distinct logical processor. Each VMSO may comprise a guest state area and a host state area, the guest state area holding the CPU state of the respective VM (i.e., of the respective virtualized processor), and the host state area storing the current state of hypervisor 30. In some embodiments, the guest-state area of the VMSO includes contents of the control registers (e.g., CR0, CR3, etc.), instruction pointer (e.g., RIP), general-purpose registers (e.g., EAX, ECX, etc.), and status registers (e.g., EFLAGS) of the virtual processor of the respective VM, among others. The host state area of the VMSO may include a pointer (e.g., an EPT pointer on Intel® platforms) to a page table configured for address translations for the respective VM.

In some embodiments, processor 16 may store a part of a VMSO within dedicated internal registers/caches, while other parts of the respective VMSO may reside in memory 18. At any given time, at most one VMSO (herein termed the current VMSO) may be loaded onto a logical processor, identifying the virtual machine currently having control of the respective logical processor. When processor 16 switches from executing software within the VM (e.g., application 36a in FIG. 3) to executing software outside the respective VM (e.g. hypervisor 30), processor 16 may save the current processor state to the guest state area of the current VMSO and load the host state of the VMSO onto the processor. Conversely, when processor 16 switches from executing software outside the VM to executing software within the respective VM, processor 16 may save the current processor state to the host state area of the VMSO and load the guest state of the current VMSO onto processor 16.

In some embodiments, an introspection engine 40 executes outside of all guest VMs exposed on the respective client system. Introspection is an established term in the art of hardware virtualization, generically denoting gathering information about various aspects of the operation of a virtual machine from a position outside the respective VM. In some embodiments of the present invention, introspection comprises operations such as monitoring processes executing within guest VM 32, intercepting an attempt to execute a certain OS function or processor instruction within guest VM 32, intercepting an attempt to access a memory page used by guest VM 32, and determining a location in memory 18 where specific data used by guest VM is stored, among others. Engine 40 may be incorporated into hypervisor 30, or may be delivered as a software component distinct and independent from hypervisor 30, but executing at substantially similar processor privilege level as hypervisor 30. A single engine 40 may be configured to introspect multiple VMs executing on client system 12. Engine 40 may collaborate with hypervisor 30 to decrypt communications going into and/or out of client systems 12. More specifically, engine 40 may be configured to approximately locate within memory 18 an encryption key used to encrypt a message sent or received by guest VM 32, as detailed below.

Software executing on client system 12 may further comprise a network filter 42 configured to intercept communications going in or out of guest VM 32, and to exchange information with introspection engine 40. Filter 42 may listen to specific network ports, e.g., port 443 for connections respecting the TLS protocol. Filter 42 may execute within or outside VM 32. When executing outside VM 32, a single network filter may monitor communications going into or out of multiple VMs executing on client system 12. To achieve such monitoring, hypervisor 30 may route all communications into and/or out of client system 12 through network filter 42. Filter 42 may have exclusive control of network adapter(s) 26, a configuration which may be implemented, for instance, using VT-D® technology from Intel®. When monitoring multiple VMs, filter 42 may maintain a VM-specific packet queue, i.e., associate each intercepted network packet with a source and/or destination VM.

In some embodiments, introspection engine 40 operates by detecting various events occurring during execution of software within guest VM 32. Exemplary events detected by introspection engine 40 include, for instance, a processor exception and/or interrupt, an attempt to execute a particular function of guest OS 34, a change of processor privilege (e.g., a system call), an attempt to access (read from, write to, and/or execute from) a particular memory location, etc. Introspection engine 40 may be further configured to determine memory addresses of various software components executing within guest VM 32, as further described below.

Some embodiments further comprise a utility agent 44 executing within guest VM 32, agent 44 collaborating with introspection engine 40 to detect and analyze events occurring within guest VM 32. Agent 44 may comprise, for instance, a driver executing at the processor privilege level of guest OS 34 (e.g., ring 0, kernel mode), and may be registered as a handler for various processor events such as page faults and hardware interrupts. One advantage of such configurations is that some information is much easier to obtain from inside a VM than from outside the respective VM, since an inside agent has access to all the functionality of guest OS 34. A disadvantage is that agents executing within guest VM 32 are potentially vulnerable to malicious software executing within the respective VM. To mitigate this risk, some embodiments may inject agent 44 only temporarily inside guest VM 32, and may erase agent 44 after agent 44 completes execution.

To detect events occurring within guest VM 32, introspection engine 40 may employ any method known in the art of virtualization. An important category of methods use an attempt to access a particular memory location as an indicator of occurrence of a particular event. To detect such a memory access attempt, some embodiments set up memory access permissions so that the attempt will violate the respective permissions. The violation is then intercepted by introspection engine and/or utility agent 44. Virtual machines typically operate with a virtualized physical memory, also known in the art as guest-physical memory. Virtualized physical memory comprises an abstract representation of the actual physical memory 18, for instance as a contiguous space of addresses specific to each VM, with parts of said space mapped to addresses within physical memory 18 and/or physical storage devices 24. In modern hardware virtualization platforms, such mapping is typically achieved via dedicated data structures and mechanisms controlled by processor 16, known as second level address translation (SLAT). Popular SLAT implementations include extended page tables (EPT) on Intel® platforms, and rapid virtualization indexing (RVI)/nested page tables (NPT) on AMD® platforms. In such systems, virtualized physical memory is partitioned in units known in the art as pages, a page representing the smallest unit of virtualized physical memory individually mapped to physical memory via SLAT, i.e., mapping between physical and virtualized physical memory is performed with page granularity. All pages typically have a predetermined size, e.g., 4 kilobytes, 2 megabytes, etc. The partitioning of virtualized physical memory into pages is usually configured by hypervisor 30. In some embodiments, hypervisor 30 also configures the SLAT structures and therefore the mapping between physical memory and virtualized physical memory. In some embodiments, a pointer to a SLAT data structure (e.g., to a page table) is stored within the VMSO of the respective virtual machine. The actual mapping (translation) of a virtualized physical memory address to a physical memory address may comprise looking up the physical memory address in a translation lookaside buffer (TLB) of client system 12. In some embodiments, address translation comprises performing a page walk, which includes a set of successive address look-ups in a set of page tables and/or page directories, and performing calculations such as adding an offset of a page to an address relative to the respective page.

Figure 4:
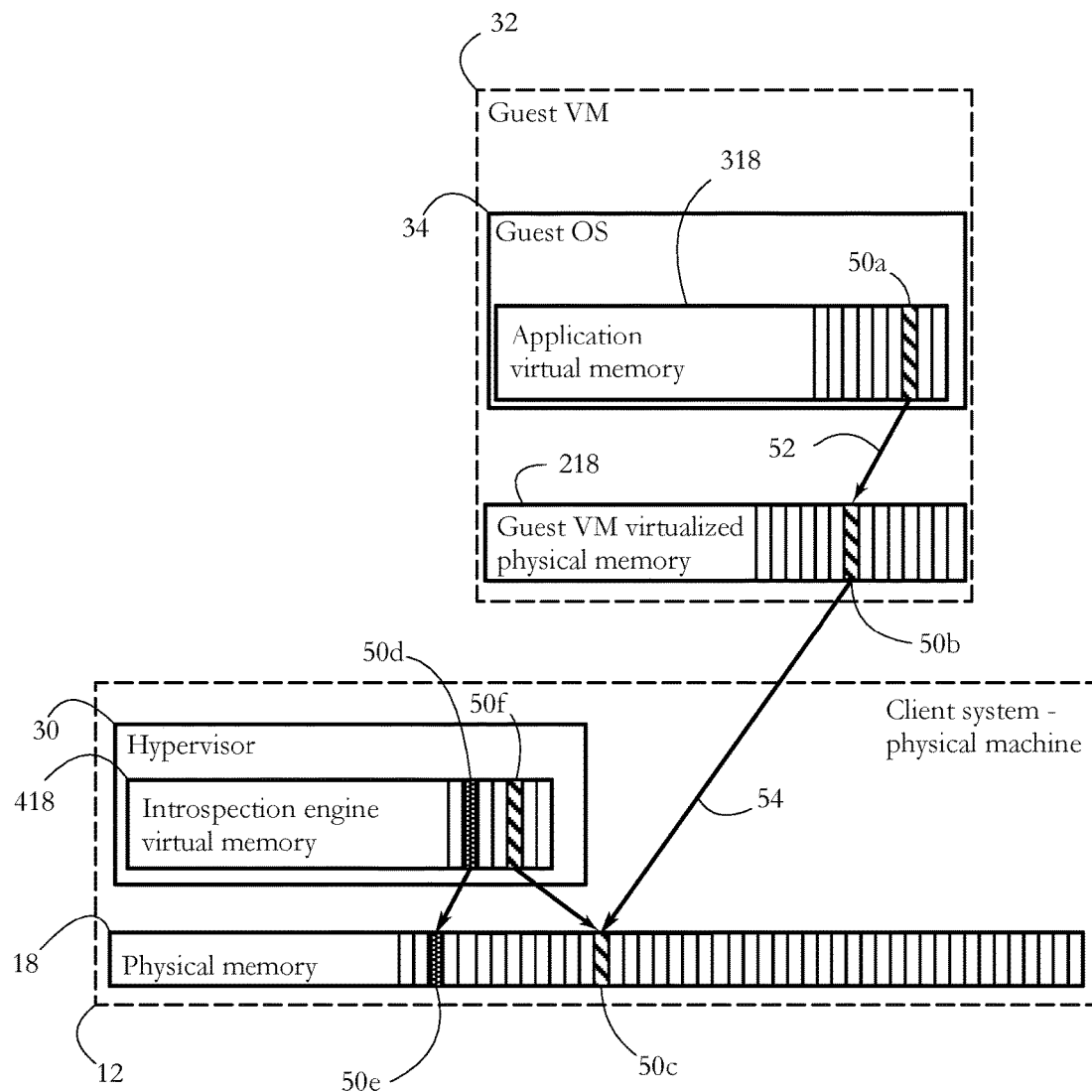
FIG. 4 shows an exemplary memory address translation in a hardware virtualization configuration as illustrated in FIG. 3.

FIG. 4 illustrates such a mapping of memory addresses in an embodiment as shown in FIG. 3. Following exposure by hypervisor 30, guest VM 32 sees a virtualized physical memory space 218 as its own physical memory space. A software object (e.g., application 36a) executing within guest VM 32 is assigned a virtual memory space 318 by guest OS 34. When the software object attempts to access a content of an exemplary memory page 50a of space 318a, an address of page 50a is translated by the virtualized processor of guest VM 32 into an address of a page 50b of virtualized physical memory space 218, according to page tables configured and controlled by guest OS 34. The address of page 50b is further mapped by physical processor 16 to an address of a page 50c within physical memory 18 using SLAT configured by hypervisor 30.

Virtual address space 218 is commonly known in the art as guest-physical memory, and an address within one such a memory space is referred to as a guest physical address (GPA). Address space 318 is usually termed guest-virtual memory, and contains guest-virtual addresses (GVA). Addresses within physical memory 18 are usually referred to as host-physical addresses (HPA). An address translation/mapping such as 52 in FIG. 4 is therefore termed GVA-to-GPA translation. In contrast, address translations such as 54 are commonly known as GPA-to-HPA translations.

In some embodiments, hypervisor 30 sets up its own virtual memory space 418 comprising a representation of physical memory 18, and employs a translation mechanism (for instance, page tables) to map addresses in space 418 to addresses in physical memory 18. In FIG. 4, such an exemplary mapping translates the address of a page 50f within virtual space 418 to the physical address of page 50c, and the address of a page 50d to the physical address of page 50e. Such mappings allow potentially any software object executing at the processor privilege level of hypervisor 30 to manage memory pages belonging to software objects executing within various VMs running on client system 12. In particular, memory introspection engine 40 may thus enumerate, read, write, and control access to physical memory pages used by any process executing within guest VM 32.

In some embodiments, detecting an event occurring within guest VM 32 comprises introspection engine 40 collaborating with hypervisor 30 to set memory access permissions within a SLAT data structure. Such features may be platform-specific, but access permissions are typically set with page granularity. For instance, on Intel® platforms that support virtualization, the EPT entry of each memory page includes a set of access permission bits that indicate whether the respective page may be read from, written to, and executed, respectively. When an attempt to access a particular memory page violates an access permission set for the respective memory page, the respective attempt may trigger a processor event, such as an exception or a virtual machine exit event (VMExit on Intel® platforms). In response to the processor event, processor 16 may switch to executing an event handler routine outside the respective VM, which allows introspection engine 40 to detect the occurrence of the respective access violation. In an alternative embodiment, a memory access violation may trigger a processor exception (e.g. a virtualization exception or #VE on Intel® platforms). In response to such processor events, processor 16 may switch to executing an event handler routine within the respective VM, i.e., without exiting the respective VM. In embodiments having a utility agent 44 as shown in FIG. 4, agent 44 may be registered as a virtualization exception handler, thus detecting memory access violations.

In some embodiments, a SLAT entry of a memory page further comprises fields (e.g., bits) that indicate whether the respective page has been accessed and/or whether the respective page has been written to. Such bits are typically called accessed and dirty bits. Some embodiments use accessed and/or dirty bits to identify memory pages which are likely to contain encryption keys, as further shown below.

In some embodiments of the present invention, introspection engine 40 is configured to monitor encrypted communications going into or out of guest VM. A communication session typically comprises a preliminary negotiation between the parties, followed by the actual exchange of encrypted messages. In the art, the former is usually called a handshake, while the content of the message is commonly known as the payload. The handshake comprises a set of exchanges which specify, among others, a cipher (i.e., encryption algorithm) and an ingredient for deriving an encryption key. Exemplary ciphers include Advanced Encryption Standard (AES)-derived block ciphers and stream ciphers such as ChaCha-20. In some embodiments, the handshake may comprise an actual key exchange performed according to a specific protocol, and/or additional steps for verifying the identity of either or both parties. Depending on the cipher, the ingredients for deriving the encryption key may comprise a set of random numbers, a public key of the communicating parties, etc.

A concrete example of a secure communication protocol is the Transport Layer Security (TLS) protocol described, for instance, in the Request for Comments (RFC) 5246 of the Internet Engineering Task Force (IETF) Network Working Group. The TLS protocol is currently used by a majority of browsers, e-commerce and secure e-banking applications. A TLS session includes, among others, a unique session identifier, a cipher specification, and a master secret shared between the communicating parties. The master secret is usually computed by each party separately, using ingredients exchanged during the handshake. The TLS handshake protocol comprises the following steps/stages:

a) Exchange hello messages to agree on cryptographic parameters for the communication. A Client Hello message sent from a client to a server may indicate a list of supported ciphers and include a client-supplied random number, among others. A Server Hello message sent from the server to the client may indicate a choice of cipher from the ones proposed by the client, and include a server-supplied random number.

b) Perform authentication of the parties. The server may send a certificate confirming its identity, and may request in turn a certificate from the client. This step may comprise a ClientCertificate message from the client and a ServerCertificate message from the server.

c) Exchange the necessary cryptographic parameters to allow the client and server to agree on or to calculate a shared secret (e.g., a pre-master secret). The cryptographic parameters may comprise a set of keys or other information according to the chosen cipher. For instance, the keys exchanged during this phase may be public cryptographic keys (Rivest-Shamir-Adleman, Diffie-Hellman, etc.) of the client and server. This step may comprise a ClientKeyExchange message transmitted by the client and/or a ServerKeyExchange message transmitted by the server. When Rivest-Shamir-Adleman (RSA) is used for server authentication and key exchange, a pre-master secret is generated by the client, encrypted under the server's public key, and sent to the server as part of the ClientKeyExchange message. The server then uses its private key to decrypt the pre-master secret. When Diffie-Hellman is used, each side computes its own pre-master secret according to a negotiated key.

d) Exchange ChangeCipherSpec messages to indicate that each sender party will henceforth encrypt the session's outgoing messages using the agreed-upon cryptographic parameters.

e) Exchange Finished messages (ClientFinished and ServerFinished) to formally end the session handshake. To allow the client and server to verify that their peer has received and/or calculated the correct security parameters (e.g., a shared secret) and that the handshake occurred without tampering by an attacker, the ClientFinished and ServerFinished messages are encrypted. Each receiving party must attempt to decrypt the received Finished message; successful decryption indicates a successful handshake.

In the TLS protocol, each party computes a master secret according to cryptographic parameters exchanged during the handshake, for instance according to the pre-master secret, and client- and server-supplied random numbers. From the master secret, each side may then determine a set of session keys. The term "session keys" will be used herein to generically denote cryptographic parameter values used for encrypting and/or decrypting communications during the current session. Exemplary session keys comprise a pre-master secret, a master secret, client and server-side write keys, initialization vectors/nonces, and message authentication codes (MAC), among others. In an embodiment using symmetric cryptography, encryption and decryption keys are identical, so knowledge of an encryption key suffices for decryption. In asymmetric cryptography, the encryption and decryption keys differ. How the session keys are used depends therefore on the negotiated cipher.

Some embodiments of the present invention rely on the observation that the session keys used for encryption during the current session must be calculated by each side before sending out the Finished message of the handshake (otherwise the respective message cannot be encrypted). Furthermore, the ingredients for deriving the session keys are received by each side as part of the handshake, for instance as part of the ServerHello, ClientKeyExchange, and ServerKeyExchange messages. Therefore, the session keys are likely to be appear in the memory of the client system sometime during the handshake. Some embodiments of the present invention use the timing of the handshake to determine an approximate memory location of the session keys.

Figure 5:
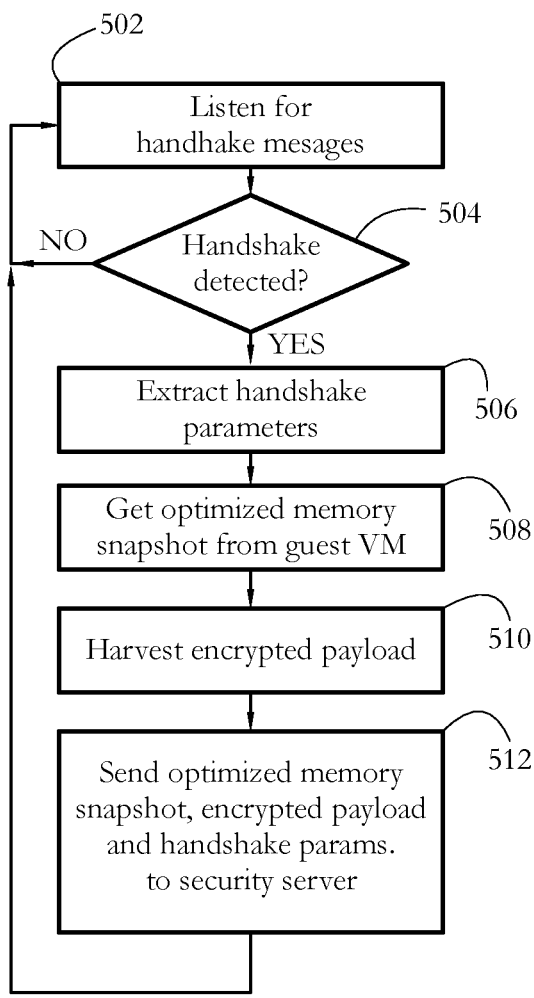
FIG. 5 shows an exemplary sequence of steps carried out by the introspection engine to intercept encrypted traffic going into or out of a guest VM, according to some embodiments of the present invention.

FIG. 5 shows an exemplary sequence of steps performed by introspection engine 40 according to some embodiments of the present invention. In a sequence of steps 502-504, engine 40 may collaborate with network filter 42 to detect a handshake message transmitted between client system 12 to a remote party (e.g., content server 13 in FIG. 1). In one example, a connection request may come from an application executing within guest VM 32, for instance a browser, and may indicate an intention to initiate an encrypted communication session, such as a TLS session, SSH session, VPN session, etc. As such, the connection request may comprise a handshake message (e.g., ClientHello) to server 13. In another example, the detected handshake message comprises a message from server 13 (e.g., a ServerHello), transmitted in response to a ClientHello received from client system 12.

When a handshake message is detected, in a step 506 introspection engine 40 may extract a set of handshake parameters such as a session ID and an indicator of the cipher to be used for the session. In an embodiment monitoring TLS connections, step 506 may further extract cryptographic parameters such as server- and/or client-supplied random numbers. Introspection engine 40 may then instruct network filter 42 to forward the handshake message to its intended recipient VM (e.g., guest VM 32 in FIG. 3).

In a step 508, introspection engine 40 may obtain an optimized memory snapshot of guest VM 32. A memory snapshot comprises a copy of the contents of a set of memory pages used by the respective VM. In some embodiments, the optimized snapshot comprises contents of a set of memory pages most likely to contain the session keys, or at least cryptographic parameter values used to derive the session keys of the current communication session. Exemplary methods for obtaining the optimized snapshot are described further below.

A step 510 may harvest the encrypted payload of the current session, by obtaining a copy of the respective payload from network filter 42. In some embodiments, network filter 42 is configured to maintain multiple data queues, for instance indexed by session ID and/or virtual machine. Network filter 42 may thus unambiguously and consistently recover the encrypted payload of a session even when the respective payload is divided into multiple packets interspersed among other communications. Next, in a step 512, introspection engine 40 may transmit the harvested optimized memory snapshot, handshake parameters, and encrypted payload to security server 15 for analysis.

Figure 6:
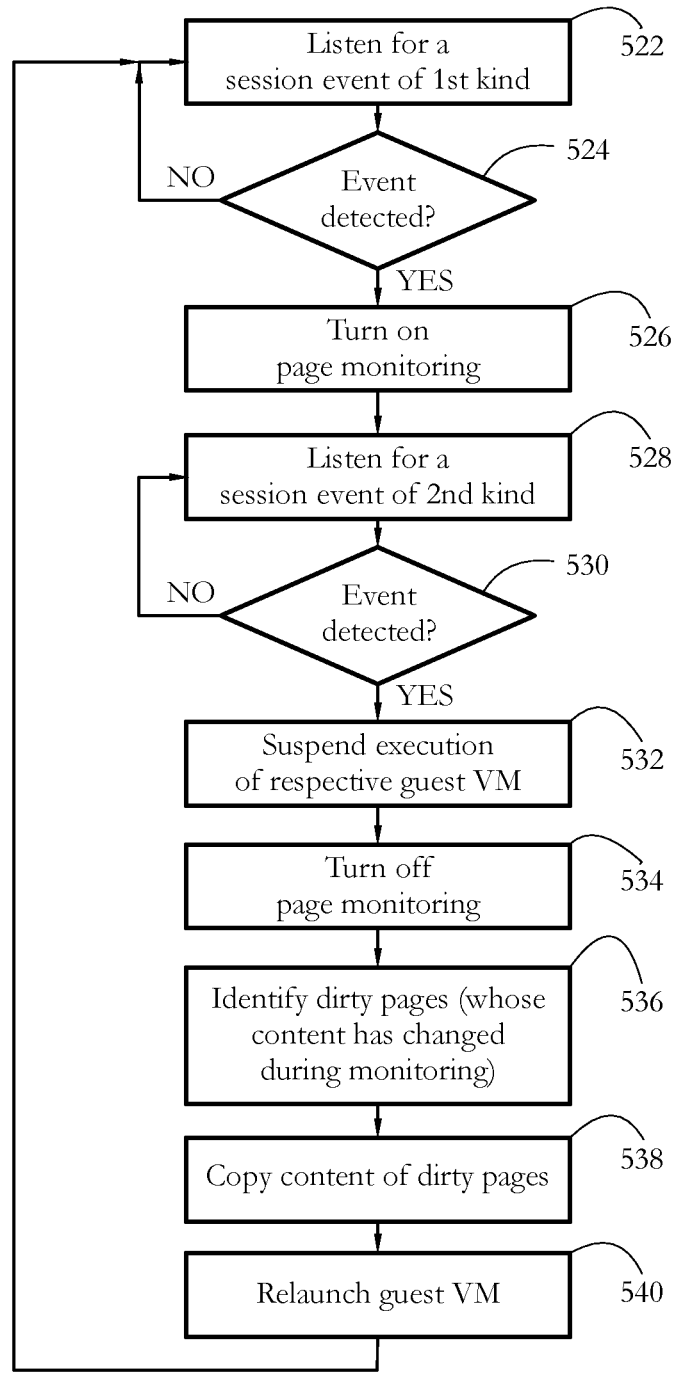
FIG. 6 shows an exemplary sequence of steps performed by the introspection engine to obtain an optimized memory snapshot of a guest VMs according to some embodiments of the present invention.

FIG. 6 shows an exemplary sequence of steps performed by introspection engine 40 to obtain an optimized memory snapshot of guest VM 32. To derive the approximate memory location of the session keys, some embodiments of the present invention identify a set of memory pages whose content has changed during a time interval which approximately coincides with the time when the respective session keys were generated.

Memory pages whose content has recently changed, i.e. pages that were recently written to, may be identified using any method known in the art. In one example, introspection engine 40 may mark a set of memory pages used by guest VM 32 as non-writable in a SLAT data structure associated with guest VM 32. Any subsequent attempt to modify the contents of such a page will then constitute a memory access violation and thus trigger a processor event (e.g., VM Exit or virtualization exception), which will then be intercepted by introspection engine 40 and/or utility agent 44. In response to intercepting the event, engine 40 may mark the respective page as writable, and re-launch the respective VM, to allow the respective write to proceed. In such a manner, engine 40 may end up with a list of "dirty" memory pages, the contents of which constitute the desired optimized memory snapshot.

The above scenario is rather inefficient and computationally costly. Several optimizations are possible on selected hardware platforms. For instance, on platforms which support accessed and/or dirty bits, some embodiments may reset the dirty bit of a page table entry (EPT entry on Intel® platforms) of a memory page used by guest VM 32, and check the value of the dirty bit at some later time to determine whether the respective page has been written to. This mechanism may be further optimized. For instance, certain generations of Intel® processors possess a feature called page modification logging (PML), which automatically exports a list of pages whose content has changed to a memory location accessible to memory introspection engine 40.

Another possible optimization strategy uses a Live Migration feature that some hypervisors (e.g., Xen®) use to efficiently migrate and/or clone virtual machines. The respective feature is built around a set of log-dirty primitives that automatically track pages that have been written to, and export a list of such pages according to a schedule.

The sequence of steps illustrated in FIG. 6 identifies pages that have been modified during a time interval between a session event of a first kind and session event of a second kind. Session events herein denote various stages of a communication protocol, for instance as described above in relation to the TLS protocol. Exemplary session events comprise for instance, sending and/or receiving messages forming part of a particular communication session (e.g., a handshake message transmitted between client system 12 and server 13, a message containing a part of an encrypted payload of the respective session, etc.). A detection of the $1^{st}$ kind of event (steps 522-524) switches the page modification monitoring on (step 526). In some embodiments, step 526 comprises suspending operation of guest VM 32, re-setting the dirty bit of SLAT entries corresponding to memory pages used by guest VM 32, and re-launching guest VM 32. In some embodiments, the set of memory pages to be monitored for writes may be narrowed down, for instance to a set of pages used by the process (e.g., browser) carrying out the current communication session, or by a process that handles encryption/decryption (e.g., LSASS.EXE in Windows®). Memory introspection engine 40 may identify pages used by the respective process/application by walking data structures used by guest OS 34 to manage threads and processes. The task of identifying such memory pages may be made easier by collaborating with utility agent 44 executing within guest VM 32—agent 44 typically has access to much more information than engine 40.

Monitoring for writes is switched off (step 534) upon detecting the occurrence of a session event of a second kind (steps 528-530), for instance the receipt of another handshake message of the respective session. A step 532 may suspend execution of guest VM 32, to prevent modifications to memory from occurring while taking the memory snapshot. In a further sequence of steps 536-538, engine 40 identifies pages that have been written to between the first and second session events, and copies the content of such pages as an optimized memory snapshot. In a further step 540, introspection engine 40 may re-launch guest VM 32.

In an alternative embodiment, the execution of guest VM 32 is not suspended for the duration of harvesting the optimized memory snapshot. Such suspensions are likely to slow the system down and impact user experience. Furthermore, suspending guest VM 32 may not be desirable for security purposes, since it may give away the fact that the respective VM is being monitored. Since the session keys are typically written once and do not move around in memory, consistency of all pages used by guest VM 32 is not required. One must simply ensure that the current session does not end (and therefore the keys do not vanish) before the dirty pages are copied. Instead of halting guest VM 32, some embodiments use network filter 42 to manipulate the flow of communication into or out of guest VM 32. For instance, filter 42 may delay the delivery of data packets from server 13 to guest VM 32 for the duration of harvesting of the memory snapshot. The delay may appear to software executing within guest VM 32 as rather normal network latency. To achieve the delay functionality, some embodiments use an inter-process notification mechanism to communicate between engine 40 and network filter 42. For instance, engine 40 may notify filter 42 in response to a successful harvesting of the optimized memory snapshot. In turn, filter 42 may notify engine 40 in response to intercepting certain network packets (e.g., the ServerHello of ServerFinished messages).

Following the observation that session keys are typically derived during the handshake part of a session, various embodiments of the present invention use various handshake events as session events of the $1^{st}$ and $2^{nd}$ kind. For instance, in some embodiments, events of the $1^{st}$ kind—that switch page monitoring on—include the interception by network filter 42 of a network packet comprising an ingredient for deriving a session key for the respective session. Exemplary ingredients include a random number, a key, and a shared secret, among others. One such exemplary session event of the $1^{st}$ kind is a ServerHello message received from server 13. Other embodiments may use. Other possible choices for an event of the $1^{st}$ kind include a ClientHello message from guest VM 32, a ClientKeyExchange, and a ServerKeyExchange message. As for session events of the $2^{nd}$ kind—that switch page monitoring off—some embodiments use the interception by network filter 42 of an encrypted message transmitted to or from guest VM 32. One example of an event of the $2^{nd}$ kind is the interception of a ClientFinished or ServerFinished message. Another possible choice event of the $2^{nd}$ kind is the interception of a packet comprising a part of a payload encrypted using a session key of the current session.

The exemplary methods described above in relation to FIGS. 5-6 apply to a single communication session. In practice, multiple sessions may be carried out concurrently within a single VM, for example by multiple instances of a browser (as in tabbed browsing), or by distinct applications running at the same time. Some embodiments are configured to track dirty pages for each session separately. For clarity, the description below will focus on the particular task of harvesting memory snapshots of TLS sessions, each snapshot comprising memory pages modified between a ServerHello message of each session and a ClientFinished message of the respective session.

Getting session-specific optimized snapshots poses an extra challenge of untangling an arbitrary sequence of session events. Some embodiments configure the page monitoring mechanism to identify all pages that have been written to between two consecutive events. Such events however may belong to distinct sessions, and may be of the first kind or of the second kind (to borrow the nomenclature used above in relation to FIG. 6). To account for this ambiguity, some embodiments of introspection engine 40 maintain a global list of currently active sessions, each entry of the list comprising information such as a session ID, a source internet protocol (IP) address, source port number, destination IP address, destination port number, and a timestamp of a ServerHello message of the respective session. Engine 40 may further maintain a global array of timestamps, storing at least one timestamp for each monitored memory page. Each timestamp of the array may be indicative of a moment in time when the respective page has been written to. For this reason, the timestamp array will herein be deemed page modification timestamp array.

Figure 7:
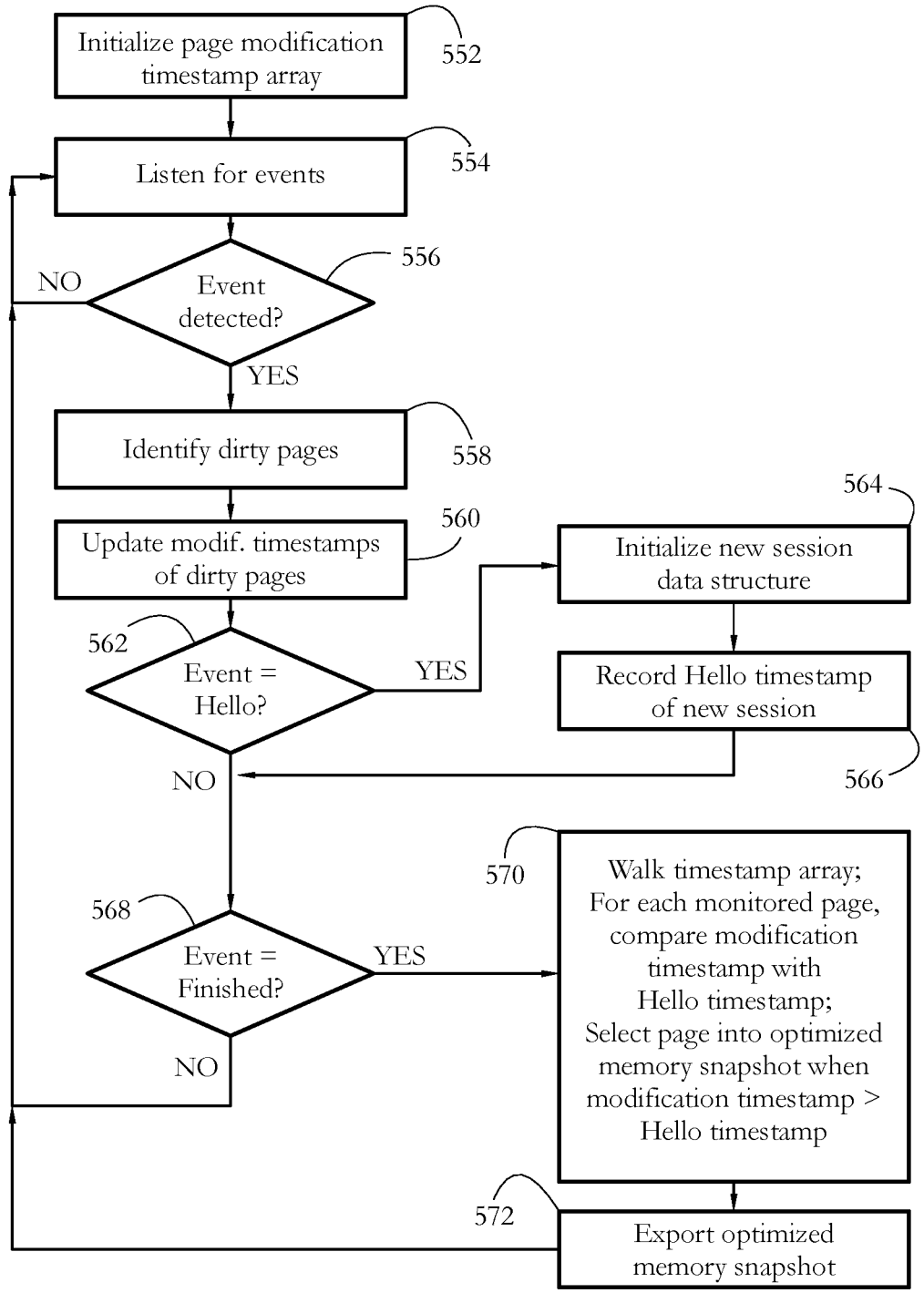
FIG. 7 illustrates an exemplary sequence of steps performed by the introspection engine to obtain optimized memory snapshots for multiple concurrent encrypted communication sessions, according to some embodiments of the present invention.

FIG. 7 shows an exemplary sequence of steps performed by memory introspection engine in an embodiment configured to track multiple concurrent TLS sessions. A step 552 initializes the page modification timestamp array. Step 552 may further comprise configuring the page modification detection mechanism (e.g., PML, resetting dirty bits, etc.). A sequence of steps 554-556 listens for events of either Hello or Finished kind. When an event is detected, in a step 558 introspection engine 40 may invoke the page modification detection mechanism to identify currently dirty pages, i.e. memory pages whose content has changed since the previous detected event, irrespective of whether it was a Hello or Finished message. A step 560 may then update the page modification timestamp array so that timestamps corresponding to dirty pages are updated to the current timestamp, or to a timestamp indicative of the occurrence of the currently detected event. When the respective event is of the $1^{st}$ kind (e.g., ServerHello), in a step 564 engine 40 may initialize a new session data structure, filling in a session ID, source and destination IP address and ports, among others. A further step 566 records a timestamp indicative of the current ServerHello event, which will herein be deemed Hello timestamp of the respective session.

When the currently detected event is of the $2^{nd}$ kind (e.g., ClientFinished), in a step 570 introspection engine 40 may walk the page modification timestamp array. For each page, some embodiments may compare the page modification timestamp of the respective page with the Hello timestamp of the respective session (i.e., of the session that the currently detected event belongs to). When the modification timestamp indicates that the respective page has been written to after the Hello event of the respective session, engine 40 may include the respective page into the optimized memory snapshot of the respective session.

Figure 8:
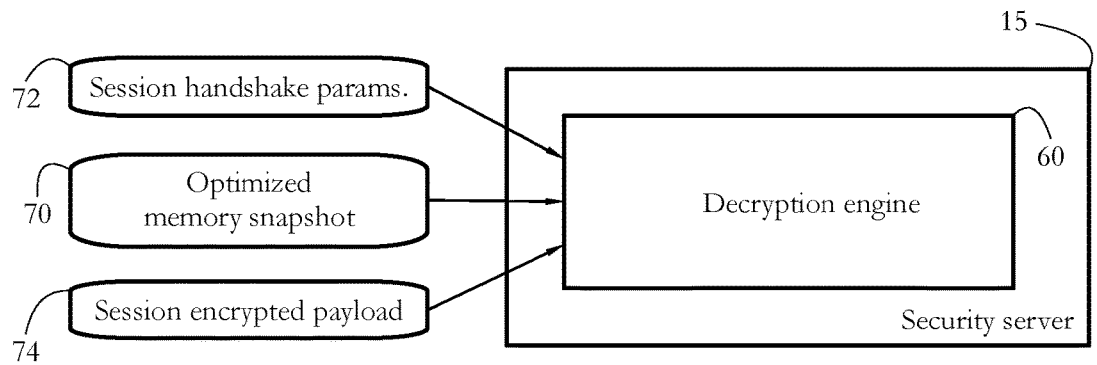
FIG. 8 shows an exemplary decryption engine executing on the security server according to some embodiments of the present invention.

FIG. 8 shows exemplary software executing on security server 15, including a decryption engine 60 according to some embodiments of the present invention. For each monitored communication session, engine 60 may receive session data from the respective client system (e.g., client systems 12a-d in FIG. 1), such as a set of handshake parameters 72, an optimized memory snapshot 70, and/or an encrypted payload 74. Such data may further comprise indicators unambiguously associating each item with a particular client system, VM, and/or communication session. Handshake parameters 72 may comprise an indicator of a cipher used to encrypt payload 74. Optimized memory snapshot 70 comprises a copy of a content of a memory page of a client system, as described above. Payload 74 comprises a part of an encrypted communication (e.g., network packet).

Figure 9:
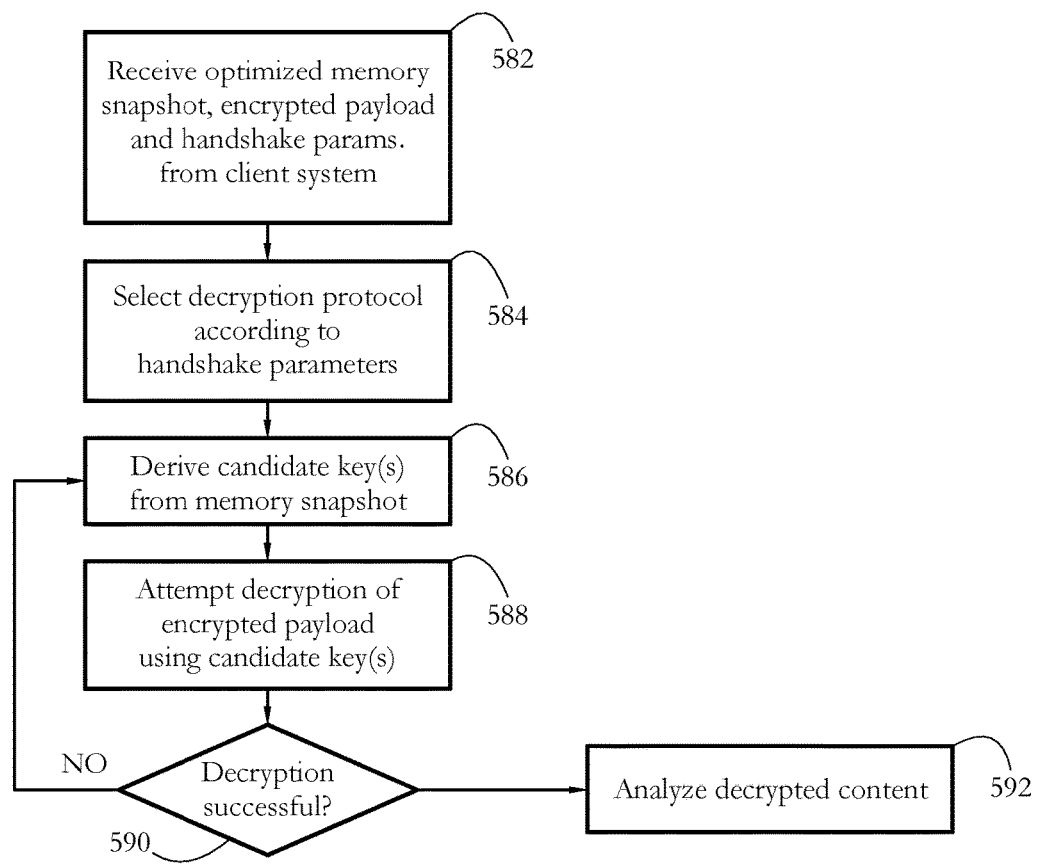
FIG. 9 shows an exemplary sequence of steps performed by the decryption engine according to some embodiments of the present invention.

FIG. 9 shows an exemplary sequence of steps performed by decryption engine 60 according to some embodiments of the present invention. In response to receiving session data from client system 12 (step 582), in a step 584 engine 60 may extract from the session data an indicator of the cipher used in the respective session. Decryption engine 60 may then select a decryption procedure/algorithm according to the cipher. Next, a sequence of steps 586-588-590 is repeated in a loop until a completion condition is satisfied, e.g., until a successful decryption of the payload is achieved, or until a time period allotted for decryption expires.

Attempts at decrypting the payload may proceed according to any method known in the art of cryptography. The procedure for harvesting the optimized memory snapshot was crafted so that the session keys, or at least cryptographic parameter values used to derive encryption and decryption keys for the respective session are likely to reside within the respective memory snapshot. The byte size of the session keys may be known a priori, or may be derived from the encryption parameters received from client system 12. However, the precise location of the session keys within the snapshot may not be known. Some embodiments may therefore search for the key material in a trial-and-error fashion. In one such example illustrated in FIG. 9, a step 586 may derive a candidate decryption key from the optimized memory snapshot. In an embodiment using symmetric cryptography (e.g. TLS protocol), the encryption and decryption keys are identical, therefore a candidate decryption key may comprise, for instance, a sequence of bytes of the snapshot, the sequence having the required byte size. In a step 588, engine 60 may attempt to decrypt at least a part of the respective session payload using the candidate keys. Success may be assessed using various methods known in the art. For example, some embodiments calculate an information entropy of the decrypted message. Low entropy typically indicate successful decryption, although such methods are known to produce false positives or false negatives.

An alternative approach to decryption uses what is known in the art as a known plaintext attack. One such embodiment exploits the fact that decryption engine 60 has access to an encrypted version of a known message, for instance, to the content of an (encrypted) ClientFinished and/or ServerFinished message exchanged during the respective session. The format and plaintext of such messages is a-priori known, being documented in the TLS protocol.

Some embodiments of the present invention allow decrypting some or all of the communications between a client system and a remote party. Examples of such communications include any communication encrypted using symmetric or asymmetric key algorithms, including Secure Socket Layer (SSL)/Transport Layer Security (TLS) connections, Secure Shell (SSH), Virtual Private Network (VPN) connections, and onion routing/anonymity network connections (e.g., TOR software). Exemplary applications of disclosed methods include detection and analysis of malicious software, intrusion detection, and surveillance, among others.

In one exemplary application, a computer system hosting at least a part of the decryption system forms part of a honeypot system. Honeypots are typically configured to allow installation of malicious software, and/or to allow an intruder to take control of some aspects of the respective computer system. Malicious software and intruders may then use an encrypted channel to communicate with outside entities, such as Command and Control (C&C) servers. By enabling decryption of such communications, some embodiments may facilitate research into malware, intrusion, and/or hacking methods.

Another exemplary anti-malware use of some embodiments comprises detecting malicious content before it infiltrates a client system. In some advanced malware attack scenarios, a malicious software agent arrives at the client via encrypted communication with an otherwise benign server, for instance via email (phishing) or online advertising. Because of encryption, typically the agent cannot be detected until it has unpacked and installed itself on the host, or even until later, when it performs some malware-indicative action. Some embodiments of the present invention may allow an early detection and incapacitation of such agents.

In another exemplary application, cloud service providers may use some embodiments to inspect encrypted traffic in quasi-real time and swiftly detect malicious data circulating to or from their servers. Such detection may prevent the respective servers from acting as launchpad for a malicious attack, for instance a distributed denial of service (DDOS) attack.

Decryption of encrypted communication is a notoriously difficult enterprise. Some conventional approaches to breaking encryption try to avoid decryption altogether. Such methods include, for instance, modifying encryption libraries to provide additional information, or introducing "backdoors" which allow a user to inconspicuously obtain access to the plaintext of the respective communication, or to an actual encryption key, or to some other information conducive to a key. Such approaches are seen as dangerous since they may weaken Internet security in the long run. They are also inconvenient by being typically non-portable, i.e., effective only on certain hardware platforms and/or operating systems. Another inconvenient is that a modification to a cryptographic library is visible to software executing on the respective client, and can thus be detected and neutralized.

Modern ciphers can only be broken using some version of a brute force attack, which typically carries a substantial computational cost. One such attack comprises trying out multiple candidate keys, until one eventually works. Some conventional decryption systems/methods search for key material within the memory of the client system. However, not knowing the actual location of the key material may make such methods impractical because of the immense computational expense required for the search. Furthermore, stopping the respective machine for the time needed to acquire a large memory dumps is likely to negatively impact user experience. Some conventional approaches attempt to optimize the search for key material by setting "tap points" in order to obtain memory dumps at certain moments of execution. However, the tap points are predefined, and thus may break if the underlying system and/or communication software is updated.

Some embodiments of the present invention rely on two key observations. First, a great number of client systems potentially benefitting from decryption execute in hardware virtualization configurations (virtual machines). Examples include server farms and cloud providers of virtual desktop infrastructure. To take advantage of such configurations, some embodiments of the present invention place an introspection engine outside a virtual machine that carries out the encrypted communication, at a processor privilege level of a hypervisor exposing the respective VM. The introspection engine may use techniques of the art of virtualization to access and inspect contents of memory used by the respective VM, potentially without knowledge or interference from software executing within the respective VM. A single introspection engine may thus inconspicuously monitor communications carried out by multiple VMs executing concurrently on the respective client system.

The second observation is that encryption keys, or at least the cryptographic parameters used to derive the respective keys, are exchanged by communication partners during a specific phase of a session, for instance during a handshake. Some embodiments use this observation to derive an approximate location of the session keys, thus allowing a reduction of the memory search area from hundreds of megabytes in conventional methods to a few memory pages (e.g., tens of kilobytes to a few megabytes). This substantially reduces the computational effort of decryption, making a brute-force attack feasible.

Some embodiments use hardware optimizations of modern processors, such as the ability to set access and/or dirty flags within a page table entry, or the page modification logging (PML) feature of some Intel® processors, to identify a set of memory pages whose content changes during a time interval that includes the exchange and/or generation of session keys. Some embodiments then search for the key material within the content of the respective memory pages.

By locating session keys according to features of the communication protocol, rather than relying on specific hardware or software features of the client system/virtual machine, some embodiments enable decryption of communications on various devices (personal computers, mobile telephones, household appliances, etc.), as well as in client systems executing multiple heterogeneous virtual machines, irrespective of operating system and communication application (e.g., browser, messaging app, VPN software, etc.).

To avoid detection by software executing within the monitored VM, some embodiments disguise the occasional delays caused by harvesting an optimized memory snapshot of the respective VM as network latency. In one example, the introspection engine collaborates with the network filter to delay delivering certain network packets to the monitored VM for the duration of acquisition of the memory snapshot. For software executing inside the VM, such delays may appear to be caused by transmission problems on the network. Also, to avoid impacting user experience, some embodiments offload the computational burden of decryption onto a separate machine (security server). The actual decryption may therefore be carried out offline.

It will be clear to one skilled in the art that the above embodiments may be altered in many ways without departing from the scope of the invention. Accordingly, the scope of the invention should be determined by the following claims and their legal equivalents.

What is claimed is:

1. A client system comprising a hardware processor and a memory, the hardware processor configured to execute a virtual machine, an introspection engine, and a network filter, the introspection engine and the network filter executing outside of the virtual machine, wherein:

the virtual machine is configured to carry out a communication session with a remote party, the communication session comprising a handshake message followed by an encrypted payload, wherein the handshake message contains an encryption parameter used by the client system to derive an encryption key, and wherein the encrypted payload is encrypted with the encryption key;

the network filter controls a network adapter of the client system and is configured to intercept the handshake message and in response, transmit a notification to the introspection engine; and the introspection engine is configured to:
 infer an occurrence of a first session event of the communication session according to the notification,
 identify within the memory a target memory page according to whether a content of the target memory page has changed between the occurrence of the first session event and an occurrence of a second session event of the communication session, and
 in response, transmit the content of the target memory page to a decryption engine configured to decrypt the encrypted payload according to the content.

2. The client system of claim 1, wherein the first session event comprises sending the handshake message from the client system to the remote party or receiving the handshake message at the client system.

3. The client system of claim 2, wherein the communication session complies with a Transport Layer Security (TLS) protocol, and wherein the handshake message comprises a ClientHello message or a ServerHello message.

4. The client system of claim 1, wherein the second session event comprises sending an encrypted data packet from the client system to the remote party or receiving the encrypted data packet at the client system, and wherein the data packet is encrypted with the encryption key.

5. The client system of claim 4, wherein the communication session complies with a Transport Layer Security protocol, and wherein the data packet comprises a part of a ClientFinished message or a part of a ServerFinished message.

6. The client system of claim 4, wherein the data packet comprises a part of the encrypted payload.

7. The client system of claim 1, wherein identifying the target memory page comprises:
 selecting a candidate memory page from a pool of memory pages used by the virtual machine;
 in response to detecting the occurrence of the second session event, determining according to a page table entry of the candidate memory page whether the candidate memory page has been written to prior to the occurrence of the second session event;
 in response to determining whether the candidate memory page has been written to, when the candidate memory page has been written to, selecting the candidate memory page as the target memory page.

8. The client system of claim 1, wherein:
the introspection engine is further configured, in response to the occurrence of the second session event, to copy the content of the target memory page, and in response, to transmit a second notification to the network filter; and
the network filter is configured to intercept a data packet destined for the virtual machine, and in response, to delay delivery of the data packet to the virtual machine until receiving the second notification.

9. The client system of claim 1, wherein the introspection engine is further configured, in response to an occurrence of a third event, to identify the target memory page further according to whether the content of the target memory page has changed between the occurrence of the first session event and the occurrence of the third event, wherein the occurrence of the third event is caused by another communication session concurrent with the communication session.

10. A server computer system comprising a hardware processor configured to execute a decryption engine configured to carry out decryption procedures for a plurality of client systems, a decryption procedure comprising:
 receiving an encrypted payload of a communication session carried out between a virtual machine executing on the client system and a remote party; and
 in response, decrypting the encrypted payload according to the content of the target memory page,
 wherein the communication session comprises a handshake message followed by the encrypted payload, wherein the handshake message contains an encryption parameter used by the client system to derive an encryption key, wherein the encrypted payload is encrypted with the encryption key, and
 wherein the client system is configured to execute an introspection engine and a network filter, the introspection engine and the network filter executing outside of the virtual machine, wherein:
 the network filter controls a network adapter of the client system and is configured to intercept the handshake message and in response, transmit a notification to the introspection engine, and
 the introspection engine is configured to:
 infer an occurrence of a first session event of the communication session according to the notification, and
 identify the target memory page within a memory of the client system according to whether the content of the target memory page has changed between the occurrence of the first session event and an occurrence of a second session event of the communication session.

11. The server computer system of claim 10, wherein decrypting the encrypted payload comprises:
 deriving a candidate decryption key from the content of the target memory page; and
 attempting to decrypt the encrypted payload using the candidate decryption key.

12. The server computer system of claim 10, wherein the first session event comprises sending the handshake message from the client system to the remote party or receiving the handshake message at the client system.

13. The server computer system of claim 12, wherein the communication session complies with a Transport Layer Security protocol, and wherein the handshake message comprises a ClientHello message or a ServerHello message.

14. The server computer system of claim 12, wherein the second session event comprises sending an encrypted data packet from the client system to the remote party or receiving the encrypted data packet at the client system, wherein the data packet is encrypted with the encryption key.

15. The server computer system of claim 14, wherein the communication session complies with a Transport Layer Security protocol, and wherein the data packet comprises a part of a ClientFinished message or a part of a ServerFinished message.

16. The server computer system of claim 14, wherein the data packet comprises a part of the encrypted payload.

17. The server computer system of claim 10, wherein identifying the target memory page comprises:
   selecting a candidate memory page from a pool of memory pages used by the virtual machine;
   in response to detecting the occurrence of the second session event, determine according to a page table entry of the candidate memory page whether the candidate memory page has been written to prior to the occurrence of the second session event;
   in response to determining whether the candidate memory page has been written to, when the candidate memory page has been written to, select the candidate memory page as the target memory page.

18. The server computer system of claim 10, wherein:
   the introspection engine is further configured, in response to the occurrence of the second session event, to copy the content of the target memory page, and in response, to transmit a second notification to the network filter; and
   the network filter is configured to intercept a data packet destined for the virtual machine, and in response, to delay delivery of the data packet to the virtual machine until receiving the second notification.

19. The server computer system of claim 10, wherein the introspection engine is further configured, in response to an occurrence of a third event, to identify the target memory page further according to whether the content of the target memory page has changed between the occurrence of the first session event and the occurrence of the third event, wherein the occurrence of the occurrence of the third event is caused by another communication session concurrent with the communication session.

20. The server computer system of claim 10, wherein the hardware processor is further configured to determine whether the client system comprises malicious software according to a result of decrypting the encrypted payload.

21. A non-transitory computer-readable medium storing instructions which, when executed by a hardware processor of a client system further comprising a memory, cause the hardware processor to form an introspection engine and a network filter, the introspection engine and network filter executing outside a virtual machine executing on the client system, wherein:
   the virtual machine is configured to carry out a communication session with a remote party, the communication session comprising a handshake message followed by an encrypted payload, wherein the handshake message contains an encryption parameter used by the client system to derive an encryption key, and wherein the encrypted payload is encrypted with the encryption key;
   the network filter controls a network adapter of the client system and is configured to intercept the handshake message and in response to, to transmit a notification to the introspection engine; and
   the introspection engine is configured to:
      infer an occurrence of a first session event of the communication session according to the notification,
      identify within the memory a target memory page according to whether a content of the target memory page has changed between the occurrence of the first session event and an occurrence of a second session event of the communication session, and
      in response, transmit the content of the target memory page to a decryption engine configured to decrypt the encrypted payload according to the content.

22. A method of decrypting encrypted communications between a client system and a remote party, wherein the client system is configured to execute a virtual machine, wherein:
   the virtual machine is configured to carry out a communication session with the remote party, the communication session comprising a handshake message followed by an encrypted payload, wherein the handshake message contains an encryption parameter used by the client system to derive an encryption key, and wherein the encrypted payload is encrypted with the encryption key,
   the method comprising:
      employing at least one hardware processor of the client system to intercept the handshake message;
      employing the at least one hardware processor to infer an occurrence of a first session event of the communication session according to the interception;
      employing the at least one hardware processor to identify within a memory of the client system a target memory page according to whether a content of the target memory page has changed between the occurrence of the first session event and an occurrence of a second session event of the communication session;
      employing the at least one hardware processor to harvest the encrypted payload; and
      decrypting the encrypted payload according to the content of the target memory page.

* * * * *